3,117,837
SEPARATION OF AMMONIUM SALT INTO NH₃ AND ACID
Fritz Haase, Chur, Switzerland
No Drawing. Filed Aug. 18, 1961, Ser. No. 132,299
Claims priority, application Switzerland Aug. 29, 1960
7 Claims. (Cl. 23—150)

The present invention, in its generic aspect, relates to the separation of ammonium salts into $NH_3$ and free acid. It relates more especially to the separation of ammonium chloride into ammonia and HCl.

HCl is generally produced according to the following processes:

Reaction of common salt (NaCl) with sulfuric acid—

$$2NaCl + H_2SO_4 = Na_2SO_4 + 2HCl$$

Electrolysis of an aqueous solution of common salt, producing caustic soda, chlorine and hydrogen, the latter two being combined to yield HCl—

$$Cl_2 + H_2 = 2HCl$$

HCl is also obtained as a byproduct from the chlorination of hydrocarbons.

According to the present invention, ammonium chloride vapor, which continuously decomposes into ammonia and HCl, is passed through a metal salt, advantageously a halide, for example nickel chloride. The ammonia is bound by the salt according to the equilibrium equation:

$$NiCl_2 + NH_4Cl \rightleftharpoons NiCl_2.NH_3 + HCl$$

This method of separation thus is based on the formation of an ammoniate as intermediate compound. Generally, ammoniates are prepared by the reaction of salts with ammonia and not with ammonium chloride. An essential characteristic of the ammoniates employed according to the present invention is that the ammoniate vapor pressure at a particular temperature be smaller than the partial pressure of ammonia at the same temperature. Nickel chloride and, e.g., the magnesium halides form such ammoniates; zinc chloride does not ($ZnCl_2.NH_3$ lacks the afore-recited characteristic).

Other ammonium salts can also be separated into ammonia and acid by the sample principle, insofar as these salts have a higher ammonia-vapor pressure, at the same temperature, than the ammoniates of the salts to be separated. Examples of such ammonium salts are ammonium sulfite, ammonium carbonate and ammonium cyanide; in consequence of the low sublimation points (150° C., <100° C. and 40° C.) of these salts, the number of available metal salts which can be employed for their separation is considerably increased so that, e.g., in addition to halides of nickel and magnesium, use can also be made of salts of iron, cobalt and manganese. For the sake of simplicity, the following description is made in connection with ammonium chloride (as typical ammonium salt).

When ammonium chloride vapor is passed through a metal salt, for example nickel chloride, the following equilibrium reaction takes place:

$$NiCl_2 + NH_4Cl \rightleftharpoons NiCl_2.NH_3 + HCl + 21.6 \text{ kcal.}$$

("kcal"=kilocalories)

Since with increasing temperature the equilibrium is displaced to the left, it is necessary to keep the reaction temperature within the range 280–380° C., preferably 320–360° C., by any suitable and per se conventional cooling means, for example by means of a circulating refrigerant. Under these conditions, about 30% of the ammonia present in the gaseous phase is bound in ammoniate form. The gas flowing from the nickel chloride contains less ammonia than that supplied to it. By compressing or cooling, the ammonia still present is converted into ammonium chloride according to the equilibrium reaction, whereby the remaining HCl in the gas phase is separated. It is preferred not to cool below 200° C. for the separation of the HCl from $NH_4Cl$, since the ammonium chloride is thereafter again vaporized and passed through the nickel chloride anew.

When the salt, e.g., nickel chloride, is saturated with ammonia, the supply of ammonium chloride vapor is interrupted. By pressure reduction, elevation of temperature, through-passage of a gas or by a combination of these expedients, the ammoniate is decomposed, whereby nickel chloride and ammonia are recovered.

The reaction can advantageously be carried out in a per se conventional tube furnace. In principle, any desired cooling agent can be employed, e.g., water under pressure. More advantageously, the reaction heat can be withdrawn by ammonium chloride itself or by an ammonium chloride-containing melt of, e.g., zinc chloride or the ammoniate thereof, so that the heat of reaction is simultaneously used to vaporize ammonium chloride.

The ammonium chloride separation can also be carried out in continuous manner by a fluid bed process.

Instead of vaporizing the ammonium salts first, they may be admixed in solid form with the salt acting as separating agent and which may be solid or molten, and then brought to the required reaction temperature. This mode of procedure is especially useful for ammonium salts with low sublimation point.

Since ammonium chloride frequently contains impurities, e.g., methylamine, it is desirable to purify the ammonium chloride before its admixture with the ammonia-absorbing salt. This purification can be carried out by recrystallization or, since it is more advantageous to effect the vaporization in a molten salt, e.g., zinc chloride, in order to achieve more rapid heat transfer, part of the impurities are preferably removed in the vaporizer.

Many ways have been resorted to for the purpose of separating ammonium chloride into ammonia and HCl. According to one procedure, the ammonium chloride is passed over metallic oxide, whereby the HCl is bound as metal chloride and is then regenerated by means of water vapor. According to another procedure, the ammonia is predominantly bound by an acid salt, e.g., sodium bisulfate, or by an acid, e.g., phosphoric acid. In the case of the acid salt, HCl and ammonia are displaced or expelled by vapors of organic liquids. In the case of phosphoric acid, only about ⅔ of the ammonia is recovered, it being necessary alternately to fluctuate between a very low temperature and a very high temperature.

An advantage of the procedure according to the present invention is that apart from the ammonium chloride no additional stream of vapor, either of water or an organic liquid, is required, so that the ammonia and HCl are readily obtained in pure form. The ammonia is substantially completely bound, not in salt form however, but rather in ammoniate form. A further advantage is that the ammonia binding is carried out in reversible manner, so that no ammonia and consequently also no salt is lost. In addition, only one temperature stage is required, or in the event the splitting off of ammonia is not effected by means of pressure reduction alone, a single increase in temperature is sufficient.

By applying this method of separating ammonium chloride into ammonia and HCl in the Solvay soda process, the lime calcination step can be omitted by using carbon dioxide from industrial waste gases, e.g., those from blast furnaces or from cement works, whereby a saving in energy is realized. Since such waste gases always have a discharge temperature of 200° C. and higher, they can also be used for vaporizing the ammonium chloride solution. The liberated HCl can be oxidized to chlorine by means of air or oxygen according to the Deacon process.

The present invention can also be applied to the regeneration of ion exchangers, without consumption of acid and base, the regeneration being effected in such manner with ammonia and hydrochloric acid that $NH_4Cl$ is produced, which can be decomposed back into ammonia and HCl. This procedure is of general application to the decomposition of salts into bases and acids.

If, for example, it is desired to produce caustic soda in this manner, this can be done according to the following reaction scheme, the underlined ions being retained by the exchanger:

$$NaCl + \underline{NH_4^+} = \underline{Na^+} + NH_4Cl$$
$$\underline{Na^+} + NH_4OH = \underline{NH_4^+} + NaOH$$

The caustic soda can be converted into soda with carbon dioxide, so that the ammonium chloride separation can not only constitute part of, e.g., the Solvay process, but the latter may also be entirely circumvented.

In like manner, sulfuric acid can for example be obtained from gypsum, by first preparing ammonium sulfate in known manner:

$$(NH_4)_2CO_3 + CaSO_4 = CaCO_3 + (NH_4)_2SO_4$$

and then converting the latter into the acid with the aid of an ion exchanger:

$$(NH_4)_2SO_4 + 2\underline{H^+} = 2\underline{NH_4^+} + H_2SO_4$$
$$2\underline{NH_4^+} + 2H\overline{Cl} = 2\underline{H^+} + 2NH_4Cl$$

The following example represents a presently-preferred illustrative embodiment of the invention:

54 parts by weight (=1 mol) of $NH_4Cl$ vapor at 320—340° C. are passed through 130 parts by weight of $NiCl_2$ at the same temperature in a tube furnace. (The heat of reaction may be withdrawn by an $NH_4Cl$-containing melt of $ZnCl_2$ or ammoniate of zinc chloride.) The gases leaving the furnace are cooled, any $NH_3$ remaining therein being precipitated as solid $NH_4Cl$. In this manner, 11 parts by weight of HCl are obtained. The furnace is then swept out by means of a stream of nitrogen at 400° C., whereby the $NiCl_2.NH_3$ therein is split into $NiCl_2$ and $NH_3$, 5 parts by weight of the latter being obtained. The precipitated $NH_4Cl$ is again vaporized and passed through the $NiCl_2$.

Having thus disclosed the invention, what is claimed is:

1. A process for obtaining a free acid selected from the group consisting of hydrogen chloride, hydrogen sulfite, carbonic acid and hydrogen cyanide from the corresponding ammonium salt selected from the group consisting of ammonium chloride, ammonium sulfite, ammonium carbonate and ammonium cyanide which comprises reacting the said ammonium salt in the vapor phase with an inorganic metal salt, whereby the $NH_3$ of said ammonium salt combines with the metal salt in ammoniate form and the acid of said ammonium salt is liberated, the $NH_3$-partial pressure of said ammonium salt being greater than the $NH_3$-partial pressure of the ammoniate of said metal salt at the same temperature, recombining residual $NH_3$ vapor with said acid, recovering the acid which was not combined with the $NH_3$, separately heating the metal salt ammoniate to release the $NH_3$ therefrom and to regenerate the metal salt, and returning the recombined ammonium salt and the regenerated metal salt for re-use in the process, the reaction between the vapor of said ammonium salt and said metal salt being carried out at a temperature below that at which reconstitution of the ammonium salt takes place.

2. A process for obtaining free HCl from $NH_4Cl$, which comprises reacting $NH_4Cl$ in the vapor phase with metal chloride at a temperature of 250–450° C., the $NH_3$-partial pressure of the ammoniate of said metal salt being less than the $NH_3$-partial pressure of $NH_4Cl$ at the same temperature, whereby formation of metal chloride ammoniate and liberation of HCl take place, cooling the residual vapor to recombine uncombined $NH_3$ with HCl into $NH_4Cl$, recovering the HCl which was not combined with the $NH_3$, separately heating the metal chloride ammoniate to release $NH_3$ therefrom and to regenerate the metal chloride, and returning the recombined $NH_4Cl$ and the metal chloride for re-use in the process.

3. A process according to claim 1, in which the metal salt is nickel chloride.

4. A process according to claim 1, in which the metal salt is cobalt chloride.

5. A process according to claim 1, in which the metal salt is magnesium chloride.

6. A process for obtaining a free acid selected from the group consisting of hydrogen chloride, hydrogen sulfite, carbonic acid and hydrogen cyanide from the corresponding ammonium salt selected from the group consisting of ammonium chloride, ammonium sulfite, ammonium carbonate and ammonium cyanide which comprises reacting the said ammonium salt in the vapor phase with an inorganic metal salt, whereby the $NH_3$ of said ammonium salt combines with the metal salt in ammoniate form and the acid of said ammonium salt is liberated, the $NH_3$-partial pressure of said ammonium salt being greater than the $NH_3$-partial pressure of the ammoniate of said metal salt at the same temperature, withdrawing the reaction heat to vaporize further quantities of said ammonium salt, recombining residual $NH_3$ vapor with said acid back into said ammonium salt form, recovering the free acid which was not combined with the $NH_3$, separately heating the metal salt ammoniate to release $NH_3$ therefrom and returning the recombined ammonium salt and the metal salt for re-use in the process.

7. A process according to claim 6, wherein the process is discontinuously carried out by alternate formation and dissociation of ammoniate.

References Cited in the file of this patent
UNITED STATES PATENTS

| | | |
|---|---|---|
| 1,718,420 | Kessler | June 25, 1929 |
| 2,671,713 | Miller et al. | Mar. 9, 1954 |
| 2,735,749 | Prutton et al. | Feb. 21, 1956 |
| 2,744,811 | Haller | May 8, 1956 |
| 2,787,524 | Claflin | Apr. 2, 1957 |
| 2,823,981 | Fuchsman | Feb. 18, 1958 |